United States Patent

[11] 3,589,497

| | | | | |
|---|---|---|---|---|
| [72] | Inventor | John M. Leach<br>P.O. Box 341, Belle Terre, Port Jefferson, N.Y. 11777 | | |
| [21] | Appl. No. | 816,999 | | |
| [22] | Filed | Apr. 17, 1969 | | |
| [45] | Patented | June 29, 1971<br>Division of Ser. No. 682,239, Nov. 13, 1967, Pat. No. 3,481,449. | | |

[54] MEANS FOR SPACING ARTICLES ON A CONVEYOR
6 Claims, 9 Drawing Figs.

[52] U.S. Cl. ............................................. 198/34
[51] Int. Cl. ....................................... B65g 47/26
[50] Field of Search .......................... 198/34, 76, 170

[56] References Cited
UNITED STATES PATENTS

| | | | |
|---|---|---|---|
| 3,184,039 | 5/1965 | Czarnecki ................... | 198/154 |
| 3,263,794 | 8/1966 | Burton ........................ | 198/34 |
| 3,373,860 | 3/1968 | Lindgren et al. ............. | 198/34 |

*Primary Examiner*—Evon C. Blunk
*Assistant Examiner*—Douglas D. Watts

ABSTRACT: The present invention provides a process and apparatus for conveying individual articles along a path which changes substantially vertically from one elevation to another and at a high speed where desired, and also receiving articles random spaced and moving them into a uniform spacing pattern so that they can be accurately fed into a further moving operation in a different direction without ever being stopped or having the relative travel positions of the articles changed.

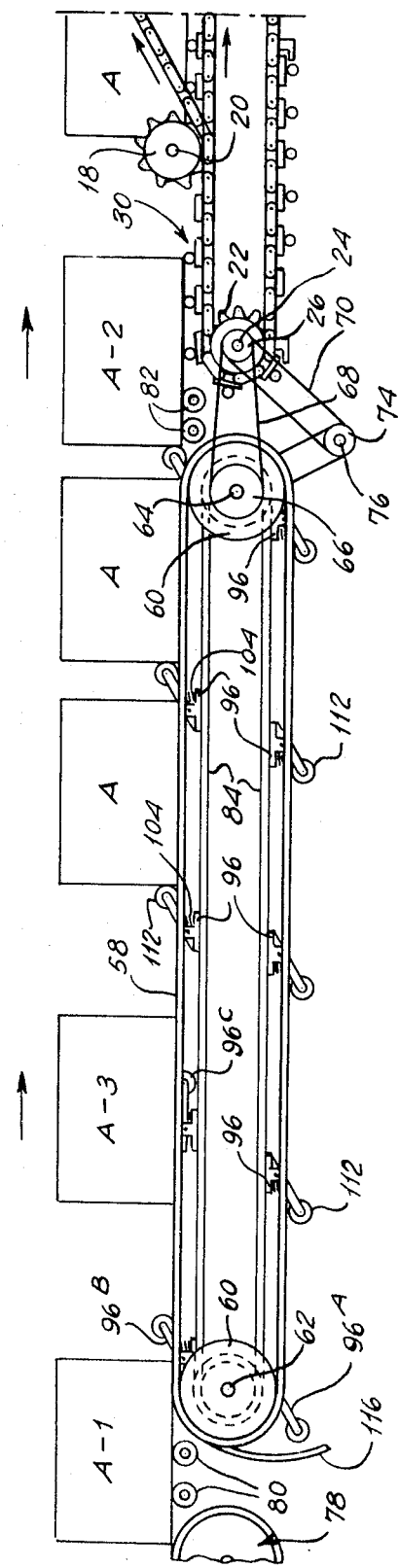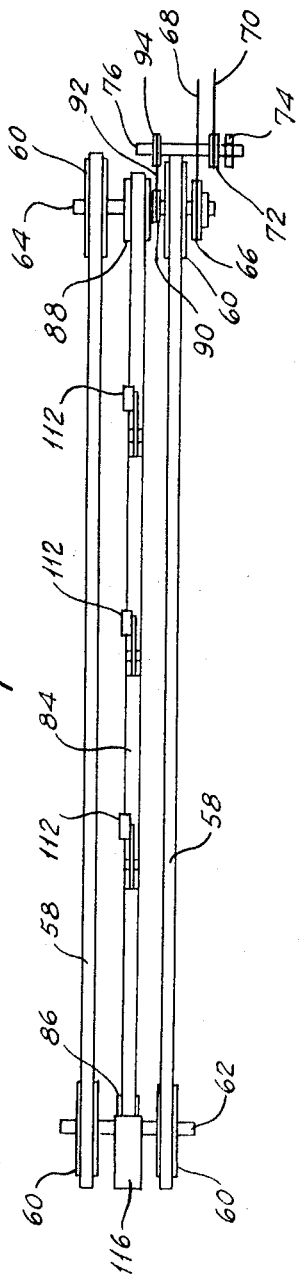
Fig. 1a
Fig. 2.
INVENTOR.
John M. Leach.

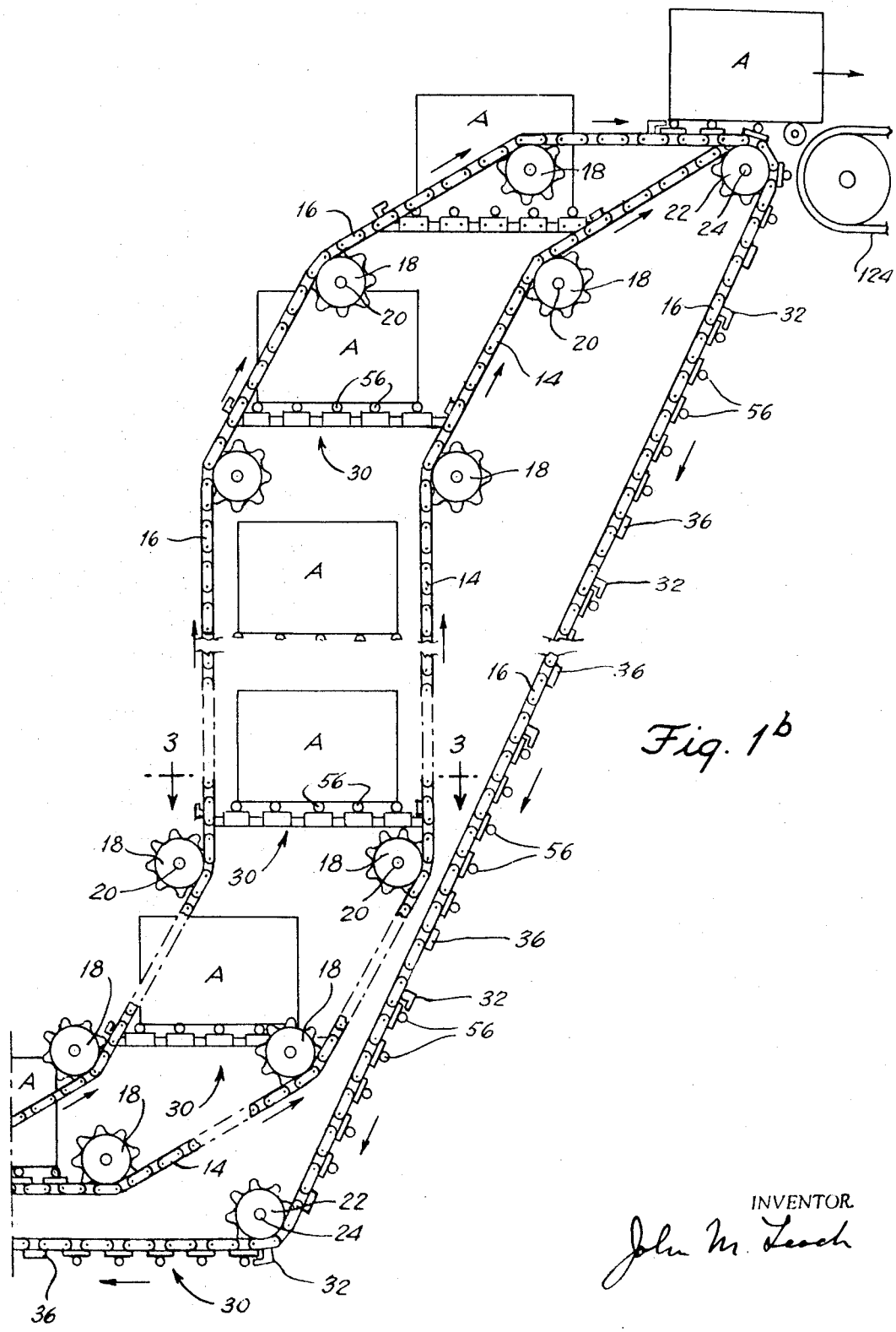

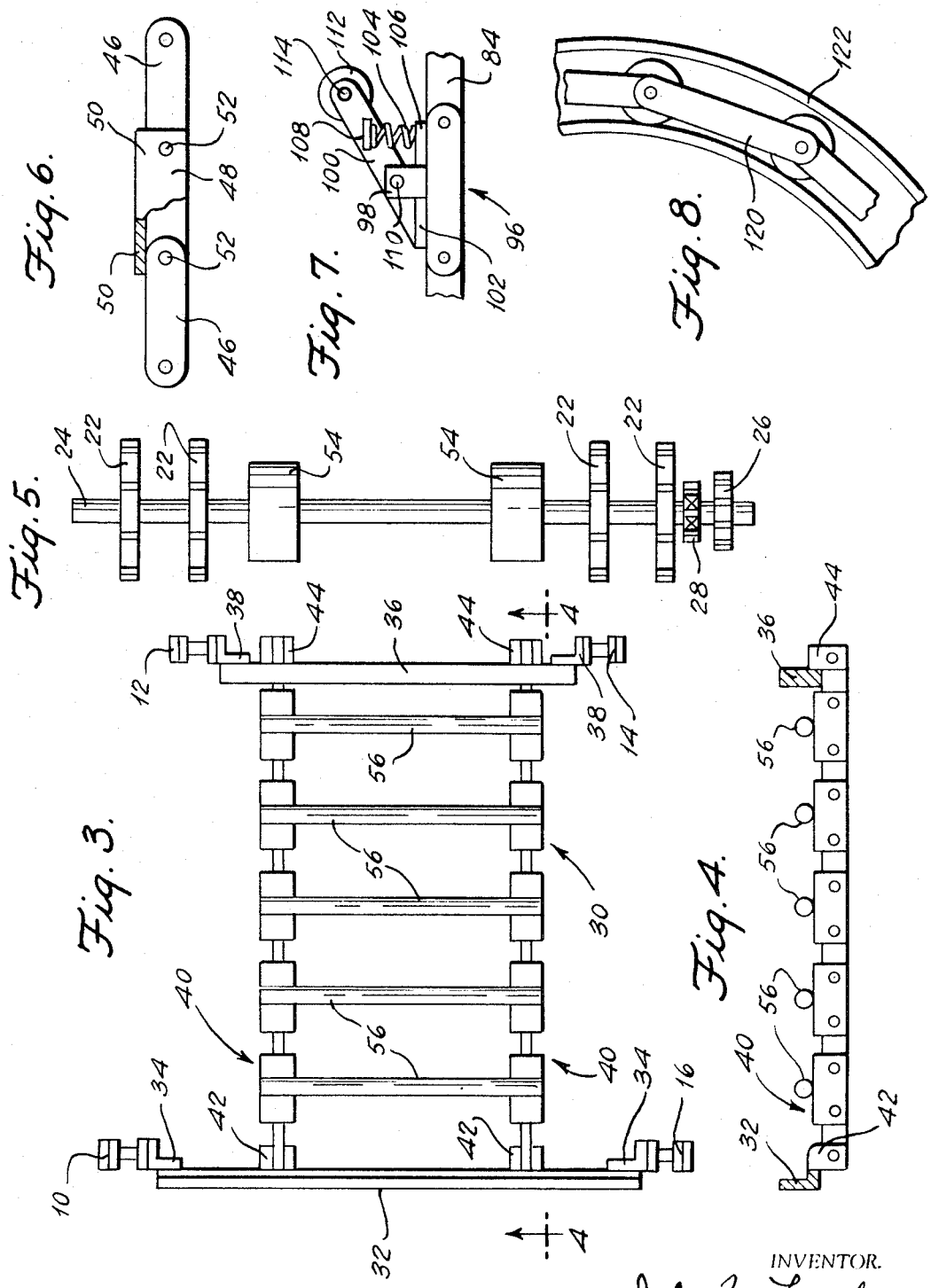

MEANS FOR SPACING ARTICLES ON A CONVEYOR

The present application is a division of Application Ser. No. 682,239, filed Nov. 13, 1967, now Pat. No. 3,481,449.

The present invention relates to a process and apparatus for conveying articles such as cartons, cases, containers, cans, bags, baskets, etc. along a path which usually for space-saving reasons makes one or more turns up or down.

Such operations heretofore have involved moving the articles substantially on a lever up to a vertical lift unit, stopping each article momentarily until a carrying platform moves into alignment with it, then moving the stopped article onto the platform which moves it to the top limit of the lift where it is moved of into further disposition.

This procedure is limited to relatively low operating speeds because fast moving articles can not be stopped abruptly without damage to fragile contents and the time lost during the stop periods is great. It is an object of the present invention to provide a process and apparatus for conveying articles from a substantially horizontal to a substantially vertical direction and vice versa without ever changing the travel position of the articles and without ever decreasing the speed of movement of the articles.

It is another object of the present invention to provide a process and apparatus for bringing articles existing in series with random spacing into a series having uniform minimum spacing by moving articles forward and never retarding the movement of nor stopping any article. It is a further object of the present invention to provide a process and apparatus capable of moving articles containing fragile contents, such as cases of filled beer bottles, along paths which change abruptly from horizontal to vertical directions and vice versa at a high speed, for example 60 and more cases per minute, consistently without breakage.

Other objects and advantages will become apparent to those skilled in the art by recourse to the following detailed description of the now preferred embodiments of the invention including the specification and the drawings in which:

FIG. 1a is a fragmentary side elevational view of a left section of the conveying apparatus of the present invention;

FIG. 1b is a fragmentary side elevational view of a right section of the conveying apparatus of the present invention;

FIG. 2 is a fragmentary plan view of the articles spacing arranger:

FIG. 3 is a sectional view taken substantially on the plane indicated by line 3-3 of FIG. 1b and looking in the direction of the arrows:

FIG. 4 is a sectional view taken substantially on the plane indicated by line 4-4 of FIG. 3 and looking in the direction of the arrows:

FIG. 5 is a plan view of the drive shaft of the apparatus:

FIG. 6 is a fragmentary detailed view showing the type of chain used to form the supports for the article carrying compartments:

FIG. 7 is a detailed view of one of the article pushers, and

FIG. 8 is a fragmentary detailed view of a modified form of chain and support capable of use in the present invention.

Throughout this specification and drawings all supporting structure and bearings which in and of themselves form no part of this invention have been omitted in order to more clearly disclose the actual invention.

The apparatus of the present invention comprises four chains 10, 12, 14 and 16 of equal length, see FIGS. 1b and 3, and supported in the configurations shown in FIG. 1b suitable sprockets 18 each of which is suitably mounted on a stub shaft 20 in turn carried by a frame not shown and sprockets 22 carried by shafts 24 as shown in FIGS. 1b and 5. It will be understood that sprockets 18 are located behind those shown in FIG. 1 to support chains 10 and 12. The shaft 24 located to the left in FIG. 1a and shown in FIG. 5 is also provided with drive sprockets 26 and 28.

As will be noted in FIGS. 1b and 3 the chains 12 and 14 run inside of chains 10 and 14 when all four chains are running side by side which is between the upper sprockets 22 and the lower left sprockets 18 in the direction shown by the arrow. In all other areas the chain pairs 10—16 and 12—14 are separated as shown.

Compartments 30 for supporting the articles being conveyed are shown in FIGS. 1b and 3. The compartments 30 are connected between the chain pairs 10—16 and 12—14 at desired intervals which are usually as close together as the size of the articles will permit and still allow for adequate clearances particularly at the entrance and exit points of the vertical conveyor.

Each compartment 30 comprises a crossbar 32 connected at its ends to chains 10 and 16 by clips 34 and a crossbar 36 connected at its end chains 12 and 14 by clips 38. Lengths of uniflex chain 40 are connected between clips 42 and 44 carried by the crossbars 32 and 36, respectively. This chain is of known type and is so called because it will flex freely in one direction, upwardly as shown in FIG. 4, but is rigid and will not flex in the opposite direction, downwardly as shown in FIG. 4. This type of chain can have many designs and the type used herewith is to be considered as exemplary and not limitative. As shown in detail in FIG. 6 it consists of inner links 46 and outer links 48 suitably connected by pivot pins 52. The outer links 48 are U-shaped in cross section and have end sections 50 which extend beyond the link pins 52 in each direction and provide stops which prevent any pivoting of the inner links 46 upwardly as shown in FIG. 6 but permit the inner links to pivot freely downwardly which enable the chains 40 to turn freely around the shafts 24, which it will be noted will be in the same direction for all three shafts 24, but will not flex downwardly while extended horizontally as shown in FIG. 1b and supporting articles. The shafts 24 are provided with drums 54 of the proper diameter to guide the chains 40 around the shafts 24 without sagging and causing undesired vibration.

Bars 56 which are preferably round in cross section are suitably fastened between the outer links 48 of the two chains 40 to support the articles.

At the high speeds at which this conveyor is capable of operating it is neither practical nor economical to attempt to place articles on the compartments 30 by hand and the regularity of the supply from even one source of articles can not be depended upon to present the articles into position to move onto the compartments 30 accurately and the regularity is even more undependable when articles are supplied from several sources. For this reason, the conveyor is provided with an article supplier which moves articles onto the compartments 30 with absolute accuracy and without ever slowing down or stopping the forward movement of the articles.

The preferred form of article supplier is shown in FIGS. 1a and 2 as comprising a pair of endless belts or strands preferably in the form of suitable chains 58 supported at the left-hand end by sprockets 60 carried by an idler shaft 62 suitably mounted in suitable bearings carried by a suitable frame not shown. The opposite ends of the chain runs are supported by sprockets 60 carried for rotation with a drive shaft 64 also suitably supported in bearings carried by the frame not shown. A driven sprocket 66 mounted for rotation with shaft 64 is driven by a chain 68 from sprocket 28 shown in FIG. 5. Sprocket 26 is driven by chain 70 from sprocket 72 mounted on counter shaft 76 which is also mounted in suitable bearings carried by a frame not shown. The shaft 76 is provided with a sprocket 74 which is driven from any desired power source not shown.

The two chain runs 58 form a conveyor which receive articles A from any desired source or sources by means of any suitable type of conveyor 78 driven at a definite desired speed which will be controlled in known manner by the size of the articles and the number of articles presented to the conveyor 78 per minute. The articles move onto chains 58 preferably across idler rollers 80 suitably supported from the frame not shown.

In a normal operation the articles A will come off of the conveyor 78 with very uneven spacing, varying from articles in contact to a number of feet between them during certain operating periods on the articles ahead or upstream from the conveyor 78. Because it is essential that there be a minimum spacing between the articles A on chains 58, these chains will always be driven at a higher rate of speed than the conveyor 78 so that even when two or more articles A are in contact the passage from the slower moving conveyor 78 to the faster moving chains 58, as shown by A-1, will create a minimum open space between adjacent articles to provide for access by the pushers to be described later to the rear vertical surfaces of said articles. The speed of the chains 58 is usually selected relative to the speed of the conveyor 78 so as to produce a minimum space of approximately 4 inches between the articles.

For the purpose of clarification the individual sprocket teeth and chain links have not been shown in FIGS. 1a and 2 relative to the article supplier.

It is necessary that the articles A be formed into a definite spacing pattern as they move along on chains 58 in order that they will individually coincide with the compartments 30 when they pass off of the chains 58 onto the compartments as shown by article A-2. Idler rollers 82 will usually be placed at the point shown. Each of these idlers will be formed of two selections with a space between them for the passage of pushers to be described later.

It is not necessary that each article space in the pattern be occupied by an article but it is necessary that each article which does arrive at the crossover point is in the proper position in the pattern to be properly received by a compartment 30. To this end an endless strand such as, chain 84 is provided which is supported at the left-hand end of its run by a sprocket 86 which is mounted for free rotation on the shaft 62, and is supported at the opposite end of its run by a sprocket 88 which is attached to a sprocket 90 so that both of the sprockets 88 and 90 together rotate on shaft 64. These last two sprockets are rotated by a chain 92 which extends between sprocket 90 and a sprocket 94 mounted for rotation with counter shaft 76.

The chains 84 has article pushers 96 suitably attached to it at desired equal intervals, for example, as shown in FIG. 7 wherein the outside links of the chain 84 are provided with attachments 98. An arm 100 is pivoted at 110 on the attachments and rests at its lower end on a plate 102 suitably attached to the outside links. A spring 104 rests at the bottom on a plate 106 also suitable attached to the outside links and presses at its to against an ear 108 carried by the arm 100. A roller 112 is pivoted at 114 for rotation freely on the arm 100.

The strength of spring 104 is selected so as to be just enough to keep the bottom of arm 100 seated on the plate 102 and not enough to create any substantial pressure against the bottom of an article A so as to even tend to raise the article.

A deflector plate or cam 116 is suitably positioned as shown so that each pusher 96 will ride under the plate as shown at 96A and be compressed against spring 104 and be held down so that its roller 112 can not contact an article A until the chain 84 at the point of connection with each pusher 96 has reached the horizontal part of its run as shown at 96B. This prevents any pusher from coming in behind an article and thus contacting it out of its selected spacing relative to the preceding pusher when measured on the horizontal. The distance between the leading edge of pusher rollers 112 must be approximately equal to the lengths of an article A plus the minimum distance of two articles. This will prevent any part of more than one article from lying between two pushers so as to avoid one pusher from supplying two articles to one compartment 30, when there is room for only one.

The number of teeth on the various drive sprockets are selected in known manner so that the speed of chain 84 exceeds the speed of chains 58 and the horizontal length of these chains on the top run is selected so that when a pusher roller 112 comes up under the left-hand edge of an article so as to just miss picking up and pushing the article the roller 112 will gradually move forward under that article as they both move along and will pick up and push the next down stream article A if there is one in that position before the leading edge of the last named article reaches contact with a compartment 30. This is occurring at pusher 96C under A-3 and pusher 96C will gradually move out ahead of article A-3 which will be picked up and pushed by pusher 96B. Since there is no article A for pusher 96C to push that space and its corresponding compartment will remain empty.

It can thus be seen that with these relationships between the length of the top run of chains 58, the distance between pushers 96, the relative speeds of chains 58 and 84 and the length of the given article A, the articles will always be placed in the proper space pattern for accurate presentation of each article to it compartment 30. To this end, the number of teeth on the various drive sprockets will also be selected in known manner so that the spaces between pushers 96 and the lengths of the compartments 30 will be synchronized in travel so that a space between pushers will always coincide with a compartment so that an article A will always be smoothly received from a space between pushers onto a compartment.

In order that the movement transition of each article A from the horizontal direction into the vertical direction can be performed smoothly and with the exertion of no extreme forces on the article contents and also avoid any change in the travel position of each article A in changing direction from horizontal to vertical, or vice versa, the sprockets 18 have been positioned as shown so that the change of movement direction both from horizontal to vertical as well as from vertical back to horizontal is made gradually and thus gently instead of sharply.

Whenever it is desired to eliminate all transition increments, the chain and sprockets which carrying the compartments 30 can be changed to an oversize roller chain 120 which is guided and supported in a channel 122 which can be bent on any gradual radius desired as shown in FIG. 8.

The articles A pass from the vertical conveyor section to any desired point as, for example, via a suitable conveyor 124.

It is to be understood that the direction of movement of the vertical section can be reversed and the article supplier positioned to pass articles A to the top of the vertical unit which will then convey them downwardly. It is to be understood that cartons, etc. of various sizes can be conveyed on a given unit as long as the lengths of the various size cartons are selected relative to any given distance between pushers 96 so that there will be no attempt to collect more cartons between any two pushers than can be accommodated between them so that the cartons will be received by each compartment 30 without substantial projection over either end.

The foregoing is to be considered as descriptive and not limitative since many changes and modifications can be made therein without departing from the spirit of the invention.

The invention having been described, what is claimed is:

1. A conveying system comprising an article conveyor, means for driving said conveyor at a definite speed of movement, means for delivering articles to said conveyor with open spacings between them to provide access to the rear vertical surfaces thereof, an endless strand, means mounting said strand for movement parallel to and in the same direction as the movement of said conveyor, means for driving said strand at a higher speed of movement than said conveyor, a series of equally spaced-apart space pattern forming article pushers carried by said strand in position to contact articles on said conveyor, each of said article pushers comprising a spring biased depressible arm which will be depressed when an arm comes in contact with an article on said conveyor on any contactable surface thereof except the rear vertical surface, and will remain depressed until the arm moves out of contact with the slower moving article at which time said arm will move into position to contact the rear vertical surface of any uncontacted article immediately ahead of the article formerly contacted and move the said immediately ahead article at the speed of movement of said endless strand and in the space pattern formed by said pushers, and means for receiving space pattern conformed articles from said conveyor.

2. A conveyor system as specified in claim 1 in which the article conveyor comprises at least two parallel moving strands which support the articles.

3. A conveyor system as specified in claim 2 in which the moving strand is positioned between the other strands.

4. A conveying system as specified in claim 3 in which the spring biased arms are positioned so that each will be depressed when a pusher comes up under an article on said strands and will remain depressed until the pusher rides out from under and ahead of said article.

5. A conveying system as specified in claim 1 in which the means for receiving the uniformly spaced articles from said conveyor comprises a series of article supporting and moving compartments, means for supporting and moving said compartments gradually towards the vertical, ten vertically, then gradually towards the horizontal, then horizontally.

6. A conveying system as specified in claim 5 in which said compartments while moving said articles remain constantly in relative parallel positions.